United States Patent
Boe

(10) Patent No.: US 8,951,078 B2
(45) Date of Patent: Feb. 10, 2015

(54) ONBOARD FLOATING DRILLING INSTALLATION AND METHOD FOR OPERATING AN ONBOARD FLOATING DRILLING INSTALLATION

(75) Inventor: Ove Boe, Tanem (NO)

(73) Assignee: Siemens Aktiengesellschaft, Munich (DE)

( * ) Notice: Subject to any disclaimer, the term of this patent is extended or adjusted under 35 U.S.C. 154(b) by 214 days.

(21) Appl. No.: 13/639,537

(22) PCT Filed: Mar. 18, 2011

(86) PCT No.: PCT/EP2011/054114
§ 371 (c)(1),
(2), (4) Date: Dec. 3, 2012

(87) PCT Pub. No.: WO2011/124459
PCT Pub. Date: Oct. 13, 2011

(65) Prior Publication Data
US 2013/0078875 A1    Mar. 28, 2013

(30) Foreign Application Priority Data
Apr. 9, 2010 (EP) .................................. 10159486

(51) Int. Cl.
| | | |
|---|---|---|
| *B63H 25/42* | (2006.01) | |
| *E21B 41/00* | (2006.01) | |
| *H02J 3/38* | (2006.01) | |
| *B63H 21/17* | (2006.01) | |
| *B63J 3/02* | (2006.01) | |
| *B63J 3/04* | (2006.01) | |
| *B63J 3/00* | (2006.01) | |

(52) U.S. Cl.
CPC ............ *B63H 25/42* (2013.01); *E21B 41/0007* (2013.01); *H02J 3/38* (2013.01); *B63H 21/17* (2013.01); *B63J 3/02* (2013.01); *B63J 3/04* (2013.01); *B63J 2003/002* (2013.01)
USPC ............................................ 440/1; 114/144 B

(58) Field of Classification Search
USPC ............. 114/144 B; 440/1, 3; 175/5; 701/116
See application file for complete search history.

(56) References Cited

U.S. PATENT DOCUMENTS

| | | | | |
|---|---|---|---|---|
| 2,966,221 | A | | 12/1960 | Kinney ............................. 175/5 |
| 3,552,343 | A | * | 1/1971 | Scott ......................... 114/144 B |
| 3,653,636 | A | * | 4/1972 | Burrell ............................. 175/5 |

(Continued)

FOREIGN PATENT DOCUMENTS

| | | | |
|---|---|---|---|
| CN | 101002376 A | 7/2007 | ................ H02J 3/01 |
| CN | 101014915 A | 8/2007 | ............. G05B 23/02 |

(Continued)

OTHER PUBLICATIONS

International Search Report and Written Opinion, Application No. PCT/EP2011/054402, 10 pages, Dec. 21, 2011.

(Continued)

*Primary Examiner* — Lars A Olson
(74) *Attorney, Agent, or Firm* — King & Spalding L.L.P.

(57) ABSTRACT

The disclosure relates to an onboard floating drilling installation and to a method for operating an onboard floating drilling installation, comprising a draw-works for reeling out and reeling in a drilling line, comprising several thrusters for dynamic positioning the onboard floating drilling installation and comprising at least one generator to operate the thrusters and the draw works.

17 Claims, 2 Drawing Sheets

(56) References Cited

U.S. PATENT DOCUMENTS

| | | | |
|---|---|---|---|
| 3,804,183 A | 4/1974 | Duncan et al. | 175/5 |
| 4,167,147 A | 9/1979 | Bergman | 114/122 |
| 4,205,379 A * | 5/1980 | Fox et al. | 701/116 |
| 4,232,903 A | 11/1980 | Welling et al. | 299/8 |
| 4,301,760 A * | 11/1981 | Cassone et al. | 114/144 B |
| 4,516,882 A | 5/1985 | Brewer et al. | 405/224 |
| 5,894,895 A * | 4/1999 | Welsh | 175/5 |
| 6,374,519 B1 | 4/2002 | Beaumont | 37/307 |
| 6,886,487 B2 * | 5/2005 | Fischer, III | 114/230.1 |
| 6,932,326 B1 | 8/2005 | Krabbendam | 254/334 |
| 7,514,898 B2 | 4/2009 | Djuve et al. | 318/771 |
| 7,958,715 B2 | 6/2011 | Kinert et al. | 59/78 |
| 8,008,885 B2 | 8/2011 | Jones et al. | 318/800 |
| 8,513,911 B2 | 8/2013 | Jones et al. | 318/800 |
| 2006/0064211 A1 | 3/2006 | Johansen et al. | 701/21 |
| 2009/0195074 A1 | 8/2009 | Buiel | 307/48 |
| 2009/0208295 A1 | 8/2009 | Kinert et al. | 405/224.2 |
| 2010/0009578 A1 | 1/2010 | Daum et al. | 440/1 |
| 2011/0183554 A1 | 7/2011 | Daum et al. | 440/1 |
| 2013/0029543 A1 | 1/2013 | Gjerpe | 440/1 |

FOREIGN PATENT DOCUMENTS

| | | | |
|---|---|---|---|
| WO | 2005/119892 A1 | 12/2005 | H02J 3/01 |
| WO | 2010/092113 A1 | 8/2010 | H02J 3/38 |
| WO | 2011/124470 A2 | 10/2011 | B63H 23/24 |

OTHER PUBLICATIONS

International Search Report and Written Opinion, Application No. PCT/EP2011/054114, 9 pages, Dec. 21, 2011.

Chinese Office Action, Application No. 201180018250.2, 14 pages, Jun. 27, 2014.

Chinese Office Action, Application No. 201180028237.5, 9 pages, Jul. 24, 2014.

* cited by examiner

ONBOARD FLOATING DRILLING INSTALLATION AND METHOD FOR OPERATING AN ONBOARD FLOATING DRILLING INSTALLATION

CROSS-REFERENCE TO RELATED APPLICATIONS

This application is a U.S. National Stage Application of International Application No. PCT/EP2011/054114 filed Mar. 18, 2011, which designates the United States of America, and claims priority to EP Patent Application No. 10159486.9 filed Apr. 9, 2010. The contents of which are hereby incorporated by reference in their entirety.

TECHNICAL FIELD

This disclosure relates to a method for operating an onboard floating drilling installation, comprising a draw-works for reeling out and reeling in a drilling line, comprising several thrusters for dynamic positioning the onboard floating drilling installation and comprising at least one generator to operate the thrusters and the draw works. The disclosure also relates to an onboard floating drilling installation, comprising a draw-works for reeling out and reeling in a drilling line, comprising several thrusters for dynamic positioning the onboard floating drilling installation and comprising at least one generator to operate the thrusters and the draw works.

BACKGROUND

Onboard floating drilling installations, like drillships or semisubmersible drilling rigs, are maritime vessels which have been fitted with drilling equipment. Onboard floating drilling installations are normally used for exploratory drilling of new oil or gas wells in deep water but can also be used for scientific drilling. They are able to drill in water depths up to 3500-4000 m. Most of the onboard floating drilling installations are outfitted with a dynamic positioning system to maintain position over the well.

A dynamic positioning system is a computer controlled system to automatically maintain an onboard floating drilling installation's position and heading by using own propellers and thrusters. Position reference sensors, combined with motion sensors, wind sensors and gyro compasses, provide information to the computer of the dynamic positioning system pertaining to the onboard floating drilling installation's position and the magnitude and direction of environmental forces affecting its position.

The computer program working in the dynamic positioning system contains a mathematical model of the onboard floating drilling installation that includes information pertaining to the wind and current drag of the onboard floating drilling installation and the location of the thrusters of the onboard floating drilling installation. This knowledge, combined with the sensor information, allows the computer to calculate the required steering angle and thruster output for each thruster. This allows operations at sea where mooring or anchoring is not feasible due to deep water, congestions of pipelines or drilling equipment on the sea bottom or other problems.

Dynamic positioning may either be absolute in that the position of the onboard floating drilling installation is locked to a fixed point over the sea bottom, or relative to a moving object like a ship or another underwater vehicle. The onboard floating drilling installation can also be positioned at an advantageous angle towards wind, waves and flow of water.

Such onboard floating drilling installations comprises draw works for reeling out and reeling in a drilling line, whereby the draw works may comprise at least one drive. Furthermore onboard floating drilling installations comprise several propellers or thrusters for dynamic positioning the onboard floating drilling installation. Further, onboard floating drilling installations comprise one or more generators for producing electric current to operate the thrusters and the draw works.

Onboard floating oil drilling installations such as semisubmersible drilling rigs or drillships trend towards electrically operated draw-works with active heave compensation. This is used in order to keep a constant pressure on the drill bit during the drilling. This generates a need for a big oscillating load at the frequency of the sea waves.

Until now the problem has been solved by pulling the power from the onboard generators and dissipating the braking energy in braking resistors. This dissipates large amounts of energy in the braking resistors. Furthermore, this results in a varying load for the generators and thus poor fuel efficiency and also possibilities for an unstable voltage and frequency.

SUMMARY

In one embodiment, a method is provided for operating an onboard floating drilling installation, comprising a draw works for reeling out and reeling in a drilling line, comprising several thrusters for dynamic positioning the onboard floating drilling installation and comprising at least one generator to operate the thrusters and the draw works, the method comprising: a) the power consumption of the draw works over at least a certain period of time is measured and the power oscillation and the magnitude of the power consumption of the draw works over the at least certain period of time are determined, b) a power oscillation signal based on the results of the measurement of the power consumption of the draw works is generated, whereby the power oscillation signal represents the power oscillation and the magnitude of the power consumption of the draw works over the certain period of time, c) an anti-oscillation signal which represents a power oscillation with an opposite phase characteristics to the power oscillation signal of the draw works is generated, d) the anti-oscillation signal is distributed to the thrusters, and e) the power consumption of the thrusters is adjusted to the anti-oscillation signal.

In a further embodiment, the power oscillation in a drive of the draw works is induced at least partially by waves. In a further embodiment, control unit of the onboard floating drilling installation carries out at least the steps b), c) and d) disclosed above. In a further embodiment, the at least one generator produces electric current and feeds the electric current into the grid of the onboard floating drilling installation to operate the draw works and the thrusters. In a further embodiment, during the reeling out or reeling in of the drilling line by the draw works electrical motors of the draw works decelerate the drilling line of the draw works. In a further embodiment, the energy which is generated by the electrical motors of the draw works during the deceleration of the drilling line is fed into the grid of the onboard floating drilling installation by at least one four-quadrant converter. In a further embodiment, at least one braking resistor and at least one way rectifier compensate the oscillation of the power needed by the draw works and/or the thrusters. In a further embodiment, the draw works and the thrusters are connected to at least one DC bus. In a further embodiment, the several thrusters for dynamic positioning the onboard floating drilling installation are fed by position reference sensors, motion sensors, wind sensors and/or gyro compasses of a dynamic positioning system of the onboard floating drilling installation.

In another embodiment, an onboard floating drilling installation comprises draw-works for reeling out and reeling in a drilling line, comprising several thrusters for dynamic positioning the onboard floating drilling installation and comprising at least one generator to operate the thrusters and the draw works. The onboard floating drilling installation further comprises: a measuring unit for measuring the power consumption of the draw works over at least a certain period of time, means for determination of the power oscillation and the magnitude of the power consumption of the draw works over the at least certain period of time, a first generation unit for generating a power oscillation signal based on the results of the measurement of the power consumption of the draw works, whereby the power oscillation signal represents the power oscillation and the magnitude of the power consumption of the draw works over at least the certain period of time, a second generation unit for generating an anti-oscillation signal which represents a power oscillation with an opposite phase characteristics to the power oscillation signal of the draw works, a distributing unit for distributing the anti-oscillation signal to the thrusters and an adjusting device for adjusting the power consumption of the thrusters according to the anti-oscillation signal.

In a further embodiment, the measuring unit, the first and the second generation unit and the distributing unit are part of a control unit of the onboard floating drilling installation. In a further embodiment, the draw works comprises electrical motors to decelerate the drilling line of the draw works during the reeling out or reeling in of the drilling line. In a further embodiment, the onboard floating drilling installation comprises at least one four-quadrant converter for feeding energy, which is generated by the electrical motors of the draw works during the deceleration of the drilling line, into the grid of the onboard floating drilling installation. In a further embodiment, the onboard floating drilling installation comprises at least one braking resistor and at least one way rectifier for compensating the oscillation of the power needed by the draw works and/or the thrusters. In a further embodiment, the draw works and the thrusters of the onboard floating drilling installation are connected to at least one DC bus. In a further embodiment, the onboard floating drilling installation is a semisubmersible drilling rig or a drillship. In a further embodiment, the onboard floating drilling installation comprises a dynamic positioning system with position reference sensors, motion sensors, wind sensors and/or gyro compasses to feed to thrusters to keep the onboard floating drilling installation in position.

BRIEF DESCRIPTION OF THE DRAWINGS

Example embodiments will be explained in more detail below with reference to figures, in which.

DETAILED DESCRIPTION

Figure 1:
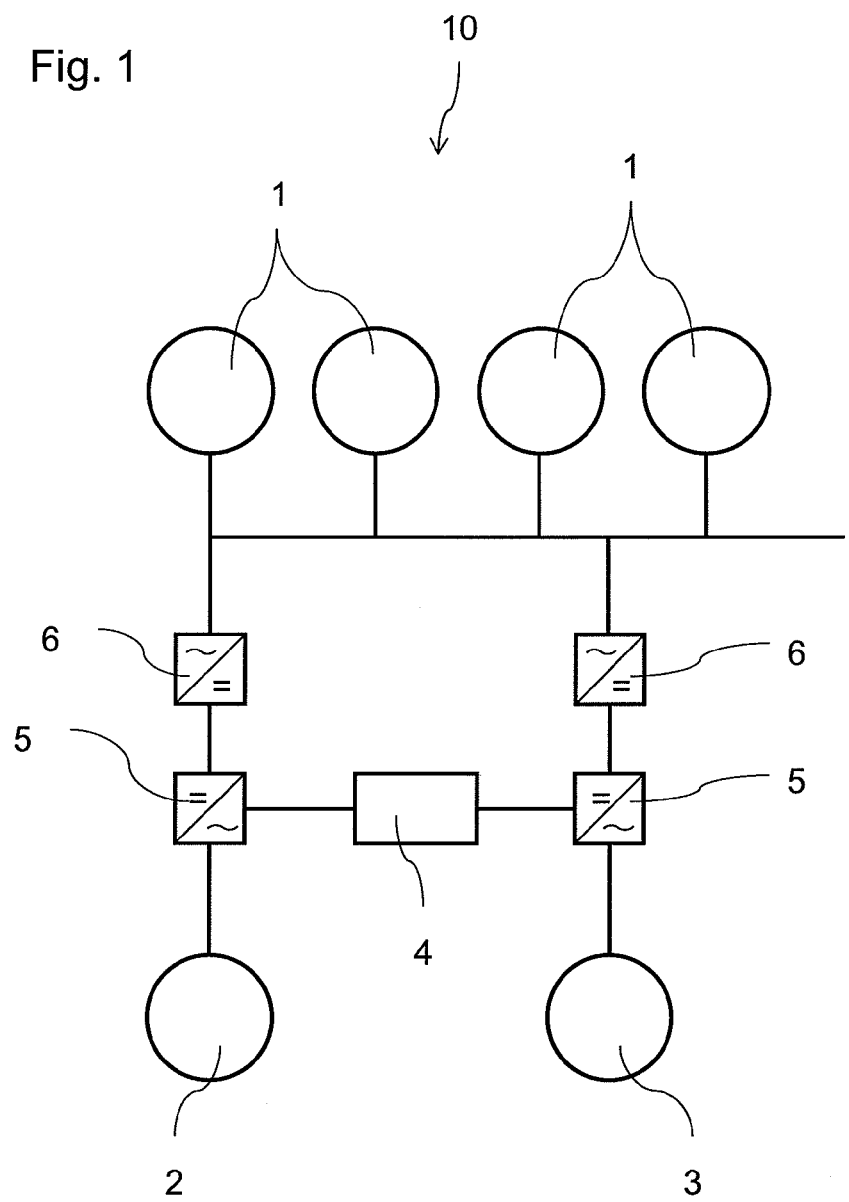
FIG. 1 shows schematic a first power supply of an onboard floating drilling installation according to one example embodiment.

Some embodiments provide a method for operating an onboard floating drilling installation and an onboard floating drilling installation, which enable that the power pull from the generators of the onboard floating drilling installation is kept as stable as possible during the operation of the thrusters and the draw-works and thus enable a low fuel consumption of the onboard floating drilling installation.

Some embodiments provide a method for operating an onboard floating drilling installation, comprising a draw-works for reeling out and reeling in a drilling line, comprising several thrusters for dynamic positioning the onboard floating drilling installation and comprising at least one generator to operate the thrusters and the draw works, whereby the method comprises:

a) the power consumption of the draw works over at least a certain period of time is measured and the power oscillation and the magnitude of the power consumption of the draw works over the at least certain period of time are determined, b) a power oscillation signal based on the results of the measurement of the power consumption of the draw works is generated, whereby the power oscillation signal represents the power oscillation and the magnitude of the power consumption of the draw works over the certain period of time, c) an anti-oscillation signal which represents a power oscillation with an opposite phase characteristics to the power oscillation signal of the draw works is generated, d) the anti-oscillation signal is distributed to the thrusters, e) the power consumption of the thrusters is adjusted to the anti-oscillation signal.

Information about the power consumption of the draw works have to be collected, This can be done over a predefined period of time or over the whole time. After measuring the power consumption of the draw works the power oscillation and the magnitude of the power consumption of the draw works are determined out of the measuring results. After this determination a power oscillation signal based on the results of the measurement of the power consumption of the draw works is generated, whereby the power oscillation signal represents the power oscillation and the magnitude of the power consumption of the draw works over the certain period of time. Based on this power oscillation signal an anti-oscillation signal for the thrusters has be generated and distributed to the individual thrusters. That means an anti-oscillation signal which represents a power oscillation with an opposite phase characteristics to the power oscillation signal of the draw works is generated in the next step. This anti-oscillation signal is then distributed to the thrusters and the power consumption of the thrusters is adjusted to the anti-oscillation signal. The anti-oscillation signal causes the thrusters to vary their load consumption in opposite phase and similar magnitude as the draw works. In this way the average thrust is not affected. The load variation on the thrusters does not have any effect on the ability to keep the onboard floating drilling installation in a steady position.

The thrusters used for dynamic positioning and the drilling drives of the draw works are interconnected in such a way that the power pull from the generators is kept as stable as possible. This is been done by generating a signal from the draw works representing the power oscillation. This power oscillation signal is superimposed on the control signal for the thrusters adjusting their power consumption to the opposite phase as the draw works and thus generating a constant power delivered from the generators. The power oscillation in the drive of the draw works can be induced at least partially by waves. The power oscillation in the drive of the draw works can be induced further by the flow of the water.

As the period of a sea wave is typically 7-10 s a variation of the thrust of this magnitude will not affect the positioning system significantly. Further, the power need for the thrusters are to a large degree connected to weather conditions with large waves and following high power oscillations from the draw works. This gives a good basis for evening out the load oscillations.

The anti-oscillation signal to the thrusters is arranged in such a way that it complies with the regulations for the relevant dynamic positioning class (DP class).

Some possible advantages of this method for operating an onboard floating drilling installation are that the generators have a much more constant load, which results in a reduced fuel consumption, and due to a lower peak power and stable load the onboard floating drilling installation can be operated with a lower number of running generators, reducing the operational cost even more. The draw works may comprise a drive. The drive of the draw works may be considered to be a drilling drive, as it is used in the drilling operation. It may for example be part of a drilling drive system of the onboard floating drilling installation. The drilling drive of the draw works may comprise one or more electrical motors.

According to one embodiment, a control unit, e.g., a dynamic positioning control unit, of the onboard floating drilling installation carries out at least the steps b), c) and d) of the before described method. The power consumption of the draw works can be measured over a defined period of time by measuring means. The determination of the power oscillation and the magnitude of the power consumption of the draw works over the defined period of time can be done by the control unit, as well. After determining the power oscillation and the magnitude of the power consumption of the draw works the power oscillation signal is generated by the control unit. Knowing the power oscillation signal the control unit can generate an anti-oscillation signal which represents the same or a similar magnitude of the load consumption and a power oscillation with an opposite phase characteristics to the power oscillation signal of the draw works. After generating the anti-oscillation signal the anti-oscillation signal is distributed by the control unit to the thrusters. The thrusters adjusted their power consumption according to the anti-oscillation signal. Thus, the thrusters pull their power from the at least one generator of the onboard floating drilling installation at that time when the draw works do not pull power from the at least one generator. Thereby the power pull from the one or more generators can be kept very stable or constant over the time, respectively.

In one embodiment, the at least one generator produces electric current and feeds the electric current into the grid of the onboard floating drilling installation to operate the draw works and the thrusters. The at least one generator feeds electric current into the onboard grid, which distributes the electric current to the draw works, in particular the drilling drive or drilling bits, and to the thrusters.

In one embodiment, during the reeling out or reeling in of the drilling line by the draw works electrical motors of the draw works decelerate the drilling line of the draw works. This ensures that the drilling line, which can be called drill string, as well, does not tear.

The energy which is generated by the electrical motors of the draw works during the deceleration of the drilling line may be fed into the grid of the onboard floating drilling installation by at least one four-quadrant converter. This enables the recirculation of energy which is generated by the electrical motors of the draw works into the grid of the onboard floating drilling installation. This reduces the need of additional encompensated by the draw works and a relatively constant force can be applied to the drilling line. For example, if the onboard floating drilling installation is lifted by a wave, the draw works can reel out the drilling line.

Dependent on the plant layout of the onboard floating drilling installation the draw works may be equipped with at least one four quadrant converter, enabling a refeeding of the braking energy to the grid of the onboard floating drilling installation, or alternatively with braking resistors and one way rectifiers, enabling only compensation of the oscillation of the active power. Therefore, at least one braking resistor and at least one way rectifier may compensate the oscillation of the power needed by the draw works and/or the thrusters.

The draw works and the thrusters may also be connected to one or more DC buses. Furthermore, this may combined and the operation may be made dependent on the overall load situation on board.

In some embodiments, at least four thrusters are used, whereby each thruster can be turned about 360 degree (angular degree), particularly in a plane substantially parallel to a water surface. The thrusters may be arranged at each corner of the onboard floating drilling installation.

In one embodiment, the several thrusters for dynamic positioning the onboard floating drilling installation are fed by position reference sensors, motion sensors, wind sensors and/or gyro compasses of a dynamic positioning system of the onboard floating drilling installation.

The dynamic positioning system can maintain the position of the onboard floating drilling installation over the well. The dynamic positioning system is a computer controlled system to automatically maintain an onboard floating drilling installation's position and heading by using the thrusters and/or propellers. Position reference sensors, combined with motion sensors, wind sensors and gyro compasses, provide information to the computer of the dynamic positioning system pertaining to the onboard floating drilling installation's position and the magnitude and direction of environmental forces affecting its position.

The computer program working in the dynamic positioning system contains a mathematical model of the onboard floating drilling installation that includes information pertaining to the wind and current drag of the onboard floating drilling installation and the location of the thrusters and/or propellers of the onboard floating drilling installation. This knowledge, combined with the sensor information, allows the computer to calculate the required steering angle and thruster output for each thruster. This allows operations at sea where mooring or anchoring is not feasible due to deep water, congestions of pipelines or drilling equipment on the sea bottom or other problems.

Dynamic positioning may either be absolute in that the position of the onboard floating drilling installation is locked to a fixed point over the sea bottom, or relative to a moving object like a ship or another underwater vehicle. The onboard floating drilling installation can also be positioned at an advantageous angle towards wind, waves and flow of water.

Other embodiments provide an onboard floating drilling installation, comprising draw-works for reeling out and reeling in a drilling line, comprising several thrusters for dynamic positioning the onboard floating drilling installation and comprising at least one generator to operate the thrusters and the draw works, whereby the onboard floating drilling installation comprises a measuring unit for measuring the power consumption of the draw works over at least a certain period of time, means for determination of the power oscillation and the magnitude of the power consumption of the draw works over the at least certain period of time, a first generation unit for generating a power oscillation signal based on the results of the measurement of the power consumption of the draw works, whereby the power oscillation signal represents the power oscillation and the magnitude of the power consumption of the draw works over at least the certain period of time, a second generation unit for generating an anti-oscillation signal which represents a power oscillation with an opposite phase characteristics to the power oscillation signal of the draw works, a distributing unit for distributing the anti-oscillation signal to the thrusters and an adjusting device for adjusting the power consumption of the thrusters according to the anti-oscillation signal. The draw works can comprise at least one drive, in particular a drilling drive.

The generators of such an onboard floating drilling installation operate with a constant load. The less variation of load reduces the fuel consumption of the generators and therefore the fuel consumption of the onboard floating drilling installation. Due to a lower peak power and stable load the onboard floating drilling installation can be operated with a lower number of running generators, reducing the operational cost even more.

Information about the power consumption of the draw works can to be collected. This can be done over a predefined period of time or over the whole time by the measuring unit of the onboard floating drilling installation. The measuring unit comprises at least one sensor for measuring the power consumption of the draw works. After measuring the power consumption of the draw works the power oscillation and the magnitude of the power consumption of the draw works are determined out of the measuring results by determination means. A first generation unit generates a power oscillation signal based on the results of the measurement of the power consumption of the draw works, whereby the power oscillation signal represents the determined power oscillation and the magnitude of the power consumption of the draw works over at least the certain period of time. A second generation unit generates an anti-oscillation signal which represents a power oscillation with an opposite phase characteristics to the power oscillation signal of the draw works. This anti-oscillation signal is distributed to the thrusters by a distributing unit. After getting the anti-oscillation signal an adjusting device adjusts the power consumption of the thrusters according to the anti-oscillation signal. The anti-oscillation signal causes the thrusters to vary their load consumption in opposite phase and similar magnitude as the draw works. In this way the average thrust is not affected. The load variation on the thrusters does not have any effect on the ability to keep the onboard floating drilling installation in a steady position.

In one embodiment, the measuring unit, the first and the second generation unit and the distributing unit are part of a control unit of the onboard floating drilling installation. The control unit can be a dynamic positioning control unit. The control unit enables a control of the power pull from the generator(s) of the onboard floating drilling installation. The control unit can further comprise the measuring unit and/or the adjusting device.

The at least one generator produces electric current and feeds the electric current into the grid of the onboard floating drilling installation to operate the draw works and the thrusters. The at least one generator comprises means for feeding electric current into the onboard grid to distribute the electric current to the draw works, in particular the drilling drive or drilling bits, and to the thrusters.

According to another embodiment, the draw works comprises a drive including one or more electrical motors for reeling out or reeling in of the drilling line.

During active heave compensation, the drilling line is reeled out by gravitational pull of the attached drill string when the onboard floating drilling installation is raised by a sea wave. The electrical motor of the draw works may be used to decelerate the drilling line of the draw works. The electrical motor can be braked by drawing electric energy from the electrical motor, i.e. the electrical motor of the draw works operates as a generator. This way, the energy of the sea waves can be converted into electric energy.

In addition to the generator(s), the energy of sea waves that is converted into electric energy by the drive of the draw works can be used to operate the thrusters or other consumers onboard the onboard floating drilling installation. The fuel consumption can thus be reduced by reuse of the wave energy.

In one embodiment, the onboard floating drilling installation comprises at least one four-quadrant converter for feeding energy, which is generated by the one or more electrical motors of the draw works during the deceleration of the drilling line, into the grid of the onboard floating drilling installation.

The energy of the sea waves converted into electric energy by the one or more electrical motors can furthermore be converted by the at least one four-quadrant converter to enable a feeding of the electric energy into the power grid. In particular, the four quadrant converter may adapt the frequency of the generated electric energy to the frequency on the power grid of the onboard floating drilling installation.

Dependent on the plant layout of the onboard floating drilling installation the draw works may be equipped with at least one four quadrant converter, enabling a refeeding of the braking energy to the grid of the onboard floating drilling installation, or alternatively with braking resistors and one way rectifiers, enabling only compensation of the oscillation of the active power. Therefore, the onboard floating drilling installation may comprise at least one braking resistor and at least one way rectifier for compensating the oscillation of the power needed by the draw works and/or the thrusters.

According to another embodiment, the draw works and the thrusters of the onboard floating drilling installation are connected to at least one DC bus.

The onboard floating drilling installation can be, for example, a vessel, like a semisubmersible drilling rig or a drillship.

The onboard floating drilling installation comprises a large-diameter steel spool, brakes, a power source like at least one generator and assorted auxiliary devices. The primary function of the draw works is to reel out and reel in the drilling line, which is a large diameter wire rope, in a controlled fashion. The drilling line is reeled over a crown block and a traveling block to gain mechanical advantage in a "block and tackle" or "pulley" fashion. This reeling out and reeling in of the drilling line causes the traveling block, and whatever may be hanging underneath it, to be lowered into or raised out of the wellbore. The reeling out of the drilling line is powered by gravity and the reeling in advantageously by an electric motor or a diesel engine.

The drilling drive can comprise all drives of the onboard floating drilling installation which are necessary to drill a wellbore. Therefore the drilling drive can comprise the drive of the draw works, one or more topdrives, an anchor winch drive and the like. The drilling drive and the drill bit are used to drill a wellbore. The onboard floating drilling installation can comprise components like a mud tank, a derrick or mast, mud pumps, the draw works, a rotary table or topdrive, the drilling line or string, the power generation equipment and auxiliary equipment. The hoisting mechanism on the onboard floating drilling installation is a large winch that spools off or takes in the drilling line and thus raises or lowers the drill stem and bit.

According to another embodiment, the onboard floating drilling installation comprises a dynamic positioning system with position reference sensors, motion sensors, wind sensors and/or gyro compasses to feed to thrusters to keep the onboard floating drilling installation in position.

The dynamic positioning system can maintain the position of the onboard floating drilling installation over the well. The dynamic positioning system is a computer controlled system to automatically maintain an onboard floating drilling installation's position and heading by using the thrusters and/or propellers. Position reference sensors, combined with motion sensors, wind sensors and gyro compasses, provide information to the computer of the dynamic positioning system pertaining to the onboard floating drilling installation's position and the magnitude and direction of environmental forces affecting its position.

The computer program working in the dynamic positioning system contains a mathematical model of the onboard floating drilling installation that includes information pertaining to the wind and current drag of the onboard floating drilling installation and the location of the thrusters and/or propellers of the onboard floating drilling installation. This knowledge, combined with the sensor information, allows the computer to calculate the required steering angle and thruster output for each thruster. This allows operations at sea where mooring or anchoring is not feasible due to deep water, congestions of pipelines or drilling equipment on the sea bottom or other problems.

Dynamic positioning may either be absolute in that the position of the onboard floating drilling installation is locked to a fixed point over the sea bottom, or relative to a moving object like a ship or another underwater vehicle. The onboard floating drilling installation can also be positioned at an advantageous angle towards wind, waves and flow of water.

Figure 2:
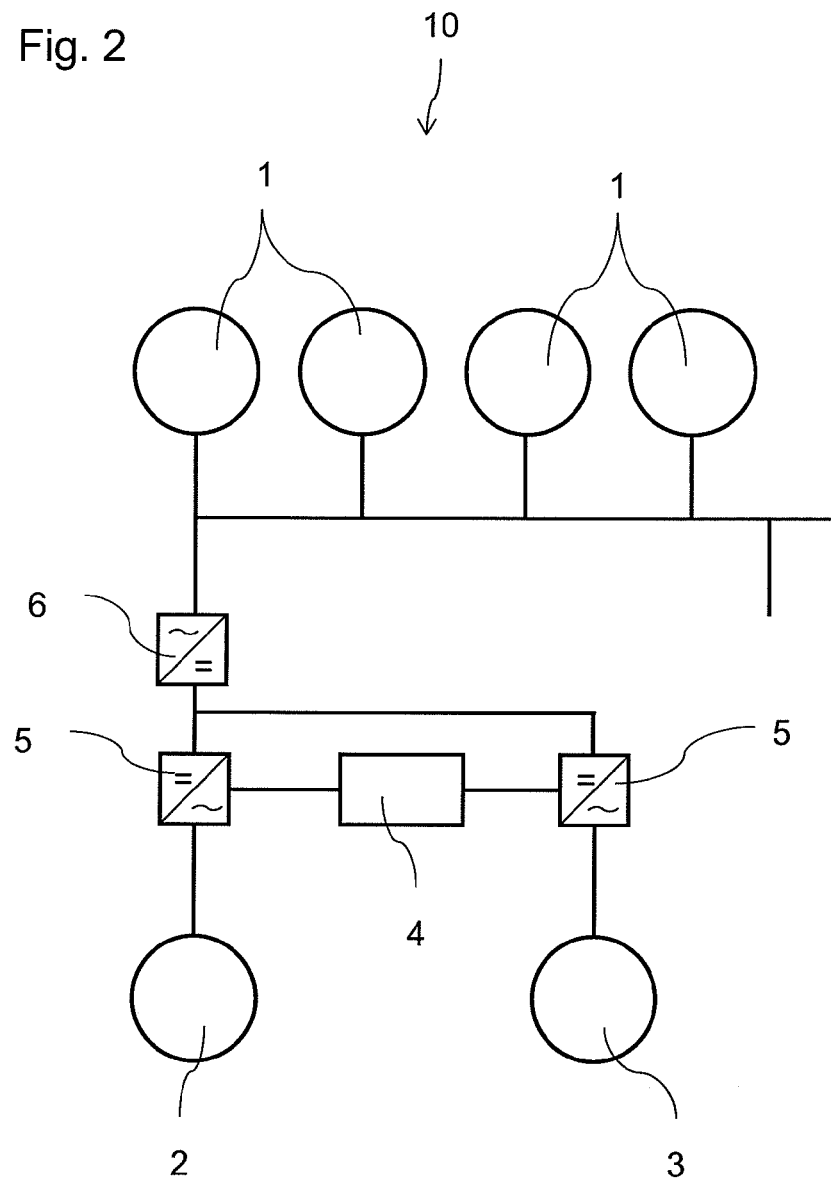
FIG. 2 shows schematic a second power supply of an onboard floating drilling installation according to another example embodiment.

FIG. 1 and FIG. 2 illustrate two different example embodiments of power supply system 10 of onboard floating drilling installations, like semisubmersible drilling rigs or drillships. The draw works 2 and the thrusters 3 pull power from the generators 1. To get a constant and stable power pull from the generators 1 a control unit is interconnected between the generators 1 and the draw works 2 and the thrusters 3. The thrusters 3 used for dynamic positioning and drilling drives of the draw works 2 are interconnected in such a way that the power pull from the generators 2 is kept as stable as possible. This is been done by generating a signal from the draw works 2 representing the power oscillation. This power oscillation signal is superimposed on the control signal for the thrusters 3 adjusting their power consumption to the opposite phase as the draw works 2 and thus generating a constant power delivered from the generators 1.

In FIG. 1 an AC bus is used for transfer of the oscillating power, wherein the rectifiers 6 are equipped to feed energy in both directions. Four-quadrant converter 5 and a control unit 4 are interconnected between the generators 1 and the draw works 2 and the thrusters 3. The four-quadrant converter 5 and the control unit 4 enable a refeeding of breaking energy to the grid of the onboard floating drilling installation. That means, during the reeling out or reeling in of the drilling line by the draw works 2 electrical motors of the draw works 2 decelerate the drilling line of the draw works 2. This breaking energy is fed into the grid of the onboard floating drilling installation by the four-quadrant converter 5. This enables the recirculation of energy which is generated by the electrical motors of the draw works 2 into the grid of the onboard floating drilling installation. This reduces the need of additional energy and saves costs for additional energy. The waves can be compensated by the draw works 2 and a relatively constant force can be applied to the drilling line.

In FIG. 2 the DC bus is used for the exchange of the oscillating energy. This makes the power supply system 10 more simple and a normal diode or thyristor rectifier 6 can be used. The one way rectifiers 6 and a control unit 4 are interconnected between the generators 1 and the draw works 2 and the thrusters 3. The one way rectifiers 6, the control unit 4 and braking resistors enable a compensation of the oscillation of the active power.

What is claimed is:

1. A method for operating an onboard floating drilling installation including a draw works for reeling out and reeling in a drilling line, several thrusters for dynamic positioning the onboard floating drilling installation, and at least one generator to operate the thrusters and the draw works, the method comprising:
   a) measuring a power consumption of the draw works over a time period and determining a power oscillation and a magnitude of the power consumption of the draw works over the time period,
   b) generating a power oscillation signal based on the results of the measured power consumption of the draw works, the power oscillation signal representing the power oscillation and the magnitude of the power consumption of the draw works over the time period,
   c) generating an anti-oscillation signal that represents a power oscillation with an opposite phase characteristic as the power oscillation signal of the draw works,
   d) distributing the anti-oscillation signal to the thrusters, and
   e) adjusting the power consumption of the thrusters based on the anti-oscillation signal.

2. The method of claim 1, comprising inducing the power oscillation in a drive of the draw works at least partially by waves.

3. The method of claim 1, wherein at least the steps b), c) and d) are performed by a control unit of the onboard floating drilling installation.

4. The method of claim 1, wherein the at least one generator produces electric current and feeds the electric current into a grid of the onboard floating drilling installation to operate the draw works and the thrusters.

5. The method of claim 1, wherein during the reeling out or reeling in of the drilling line by the draw works electrical motors of the draw works decelerate the drilling line of the draw works.

6. The method of claim 5, wherein the energy generated by the electrical motors of the draw works during the deceleration of the drilling line is fed into a grid of the onboard floating drilling installation by at least one four-quadrant converter.

7. The method of claim 1, wherein at least one braking resistor and at least one way rectifier compensate the oscillation of the power needed by at least one of the draw works and the thrusters.

8. The method of claim 1, wherein the draw works and the thrusters are connected to at least one DC bus.

9. The method of claim 1, wherein the thrusters for dynamic positioning of the onboard floating drilling installation received data from one or more sensors selected from the group consisting of position reference sensors, motion sensors, wind sensors, and gyro compasses of the onboard floating drilling installation.

10. An onboard floating drilling installation, comprising:
    draw-works for reeling out and reeling in a drilling line,
    thrusters configured to dynamically position the onboard floating drilling installation,
    at least one generator configured to operate the thrusters and the draw works,
    a measuring device for measuring the power consumption of the draw works over a time period, a processor programmed to determine a power oscillation and a magnitude of the power consumption of the draw works over the time period, a first generation device configured to generate a power oscillation signal based on the measured power consumption of the draw works, wherein the power oscillation signal represents the power oscillation and the magnitude of the power consumption of the draw works over the time period, a second generation unit configured to generate an anti-oscillation signal that represents a power oscillation having an opposite phase characteristic as the power oscillation signal of the draw works, a distributing device for distributing the anti-oscillation signal to the thrusters, and an adjusting device for adjusting the power consumption of the thrusters based on the anti-oscillation signal.

11. The onboard floating drilling installation of claim 10, wherein the measuring unit, the first and the second generation unit, and the distributing unit are part of a control unit of the onboard floating drilling installation.

12. The onboard floating drilling installation of claim 10, wherein the draw works comprises electrical motors configured to decelerate the drilling line of the draw works during the reeling out or reeling in of the drilling line.

13. The onboard floating drilling installation of claim 10, wherein the onboard floating drilling installation comprises at least one four-quadrant converter for feeding energy, which is generated by the electrical motors of the draw works during the deceleration of the drilling line, into the grid of the onboard floating drilling installation.

14. The onboard floating drilling installation of claim 10, wherein the onboard floating drilling installation comprises at least one braking resistor and at least one way rectifier for compensating the oscillation of the power needed by at least one of the draw works and the thrusters.

15. The onboard floating drilling installation of claim 10, wherein the draw works and the thrusters of the onboard floating drilling installation are connected to at least one DC bus.

16. The onboard floating drilling installation of claim 10, wherein the onboard floating drilling installation is a semisubmersible drilling rig or a drillship.

17. The onboard floating drilling installation of claim 10, wherein the onboard floating drilling installation comprises a dynamic positioning system with at least one sensor selected from the group consisting of position reference sensors, motion sensors, wind sensors, and gyro compasses, to feed to thrusters to keep the onboard floating drilling installation in position.

* * * * *